W. H. PECKHAM.
Spectacles.
No. 26,444.　　　　　　　　　　　　　　Patented Dec. 13, 1859.
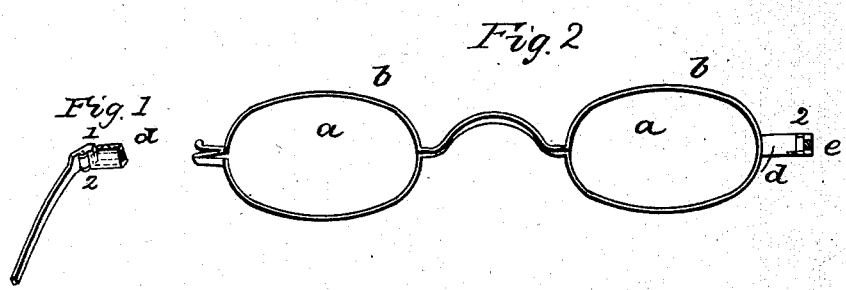

UNITED STATES PATENT OFFICE.

WILLIAM H. PECKHAM, OF HOBOKEN, NEW JERSEY.

SPECTACLE-FRAME.

Specification of Letters Patent No. 26,444, dated December 13, 1859.

*To all whom it may concern:*

Be it known that I, WILLIAM H. PECKHAM, of Hoboken, in the county of Hudson and State of New Jersey, have invented, made, and applied to use a certain new and useful Improvement in Spectacle-Frames; and I do hereby declare that the following is a full, clear, and exact description of the construction and operation of the same, reference being had to the annexed drawing, making part of this specification, wherein—

Figure 1 is a view of a pair of spectacles fitted with my improvement and Fig. 2 is a perspective view of one of the temples with the clasp socket thereon.

Similar letters denote the same parts.

The convenience of parties wearing spectacles is much improved by having glasses adapted to reading and writing, to ordinary use and in walking about, and often by the use of colored glass when in strong lights. Heretofore it has been usual to carry or provide two or three pairs of glasses, adapted to the various conveniences of the wearer. To obviate this trouble spring frames have been used into which the glasses could be pressed or taken out therefrom; these however are liable to have the glasses accidentally knocked or shaken out on account of the shallowness of the groove provided in the frames, which groove can not be formed deep on account of the small amount of spring provided in the frame.

The nature of my said invention consists in providing a clasp socket on the end of the temple, receiving divided spring catches at the ends of the grooved wire surrounding the glass, the parts being so constructed that the socket clasp can be slid off and the glasses changed with great facility, and in this instance the frame surrounding the glass can be grooved as deeply as in the ordinary spectacles, and by carrying two or more sets of glasses the wearer is provided with spectacles adapted to his different occupations by simply substituting the one for the other.

In the drawing $a$, $a$, are the glasses of any desired character or shape, $b$, $b$, are the grooved frames surrounding such glasses, the same being of any desired metal, and in any usual form. At the outer ends of the frames $b$, $b$, I provide the spring catches $c$, $c$, in place of the usual pieces that are generally screwed together and form one part of the joint of the temples. In order to connect the parts $c$, $c$, and thereby retain the glasses within their respective frames, I provide the clasp sockets $d$, $d$, each of which is formed hollow to receive the spring catches $c$, $c$, and with a cross notch or slot at 1, into which a lip on the spring catch $c$, springs to retain the parts together, and which catch is to be pressed back by the thumb-nail when the clasp socket is to be slid off, for changing the glasses.

$e$, $e$, are the temples or side pieces of the spectacles united to the clasp sockets $d$, $d$, by the joints 2, 2.

Having thus described my said invention what I claim and desire to secure by Letters Patent is—

Connecting the end pieces ($c$, $c$,) of spectacle frames by the clasp sockets $d$, $d$, in the manner and for the purposes substantially as specified.

In witness whereof I have hereunto set my signature this Seventeenth day of November 1859.

WM. H. PECKHAM.

Witnesses:
 THOS. GEO. HAROLD,
 LEMUEL W. SERRELL.